United States Patent [19]
Fuller et al.

[11] Patent Number: 5,414,233
[45] Date of Patent: May 9, 1995

[54] METHOD OF ELECTRICAL DISCHARGE MACHINING FOR MANUFACTURE OF BELLEVILLE SPRINGS

[75] Inventors: Glen C. Fuller, Kenmore; Martin J. Halpin, Shortsville, both of N.Y.

[73] Assignee: Figgie International Inc., Willoughby, Ohio

[21] Appl. No.: 113,018

[22] Filed: Aug. 30, 1993

[51] Int. Cl.[6] .......................... B23H 1/00; B23H 9/00
[52] U.S. Cl. .................................................... 219/69.17
[58] Field of Search ............... 219/69.17, 69.2, 69.14, 219/69.15; 204/129.1, 129.43, 129.7

[56] References Cited

U.S. PATENT DOCUMENTS

| | | | |
|---|---|---|---|
| 3,259,383 | 7/1964 | Johnson et al. | 267/1 |
| 3,333,080 | 7/1967 | De Vries | 219/69.2 |
| 3,588,196 | 6/1971 | Bonga | 219/69.16 |
| 3,668,917 | 6/1972 | Komatsu et al. | 72/342 |
| 4,039,354 | 8/1977 | Schober | 148/16.5 |
| 4,135,283 | 1/1979 | Kohlhage | 29/173 |
| 4,215,261 | 7/1980 | Brifford | 219/69.2 |
| 4,310,742 | 1/1982 | Pfau | 219/69.17 |
| 4,487,671 | 12/1984 | McGeough | 204/129.1 |
| 4,826,580 | 5/1989 | Masuzawa et al. | 204/129.43 |
| 4,859,824 | 8/1989 | Ukaji et al. | 219/69.15 |
| 5,091,622 | 2/1992 | Ohba | 219/69.15 |

FOREIGN PATENT DOCUMENTS

| | | | |
|---|---|---|---|
| 59-59318 | 4/1984 | Japan | 219/69.17 |
| 62-277224 | 12/1987 | Japan | 219/69.17 |

Primary Examiner—Geoffrey S. Evans
Attorney, Agent, or Firm—Hodgson, Russ, Andrews, Woods & Goodyear

[57] ABSTRACT

A circular steel blank (10) having a central opening (12) is first press formed into a frusto-conical shape and then subjected to a heat treating process to provide the unfinished spring with the requisite shape and hardness. The spring is then mounted in the electrical discharge machining (EDM) apparatus to remove material on one side using a first electrode. The spring is then electrically discharge machined on a second side with a second electrode. In this manner a Belleville spring with an exact machining tolerance can be manufactured.

19 Claims, 2 Drawing Sheets

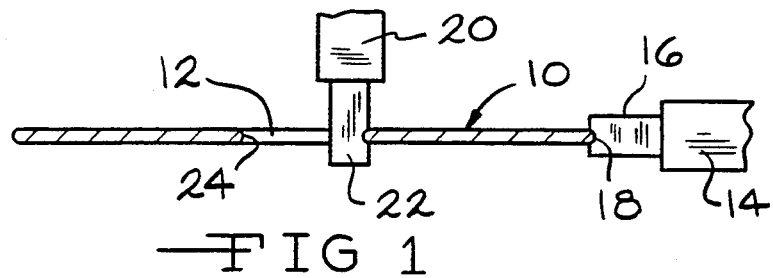
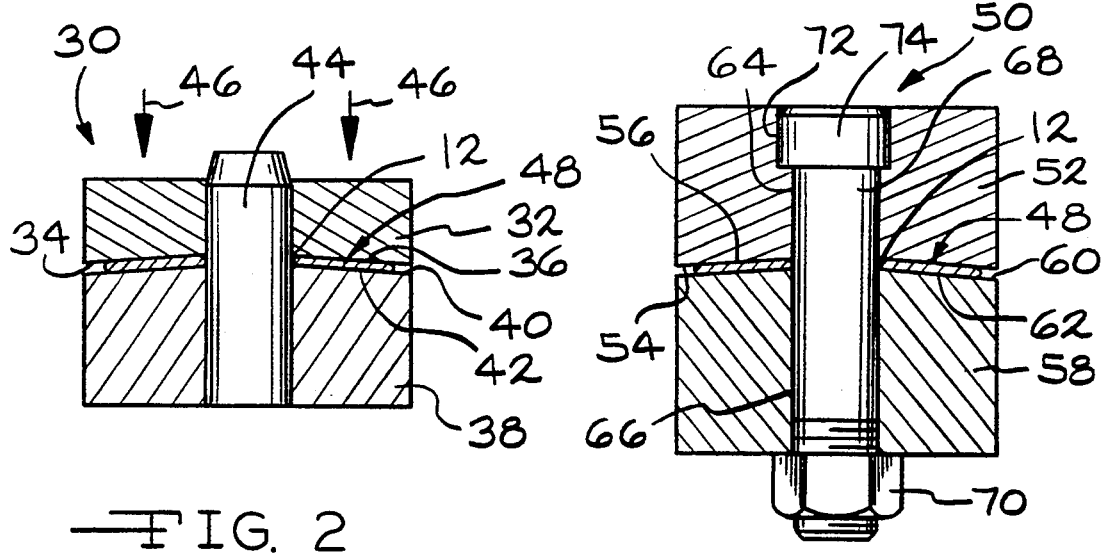
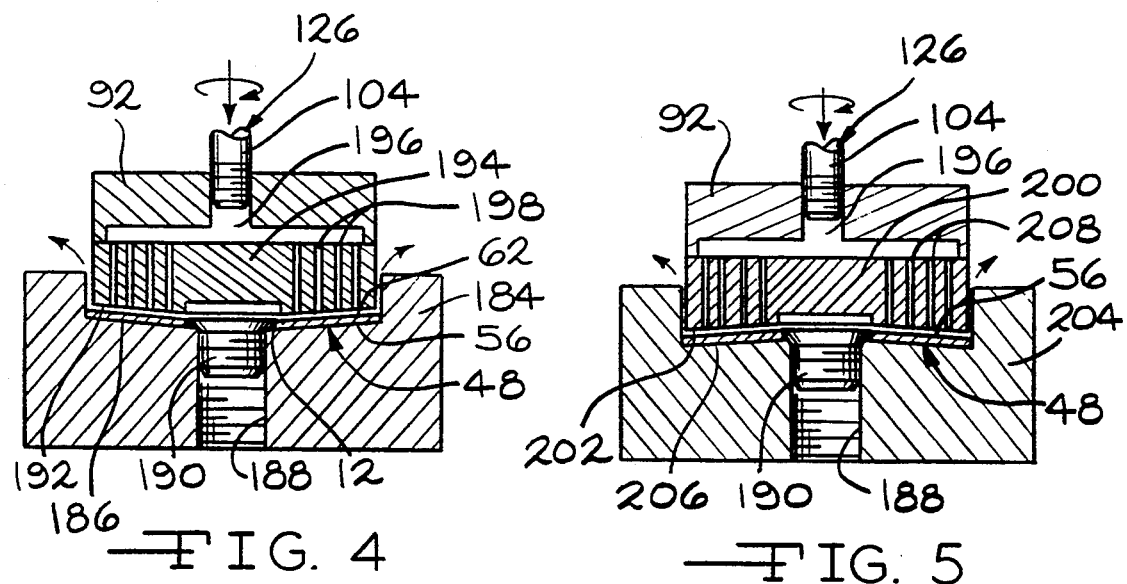

METHOD OF ELECTRICAL DISCHARGE MACHINING FOR MANUFACTURE OF BELLEVILLE SPRINGS

BACKGROUND OF THE INVENTION

1. Field of Invention

The present invention relates to a method for machining an electrode workpiece and the electrode workpiece so manufactured. In particular, the present invention relates to a method of machine finishing a frusto-conical disc spring by an electro-erosion process, wherein exact tolerances for the spring are attainable.

2. Prior Art

One of the many uses for frusto-conical disc springs, and more particularly for Belleville springs, is as a control mechanism for a gas pressure regulator. The Belleville spring provides a reference force in the gas pressure regulator for precise control of flow rate and airflow pressure such as is needed in a face piece for a breathing apparatus. Breathing apparatus are particularly useful in hostile environments including those typically encountered by firefighters, airplane crews and the like and precise regulation of the breathing air pressure at the face piece necessitates that the Belleville spring be manufactured to exacting tolerances. In order to achieve such preciseness, as well as fast production time, the Belleville spring of the present invention is produced by electro-erosion using an electro-discharge machining (EDM) process.

The electro-discharge machining process involves providing a high frequency pulsed current across a formed conductive electrode and a grounded workpiece submerged in a dielectric fluid. The electrode is rotated while being moved axially along a work centerline, through the dielectric fluid and towards the workpiece, maintaining a constant gap therebetween. A dampening rod is used to depress resonant vibration in the workpiece during the EDM process while the discharge of an electric spark from the electrode at a chosen frequency and current erodes a portion of material from the workpiece. Distortion in the surface finish of the workpiece due to heat generated during the EDM process is reduced by circulating the dielectric fluid through the gap between the electrode and the workpiece, thereby carrying away the generated heat as well as the eroded material. The power supply frequency, current and electrode movement is numerically controlled to regulate the metal removal and thereby provide the proper surface finish.

Prior to subjecting the workpiece to the EDM process to thereby manufacture the Belleville spring of the present invention, the general shape of the spring is provided by subjecting a piece of steel stock to a press-forming process. Such a process is described in U.S. Pat. No. 3,668,917 to Komatsu et al., wherein the distortion problems frequently encountered in using successive and separate steps of press forming and quenching a piece of steel stock to produce the desired shape of a Belleville spring are overcome. This prior art method provides for simultaneously press-forming and quenching the steel stock placed between a pair of cooperating die members upon heating the steel stock to its austenitizing temperature. The die members apply opposing pressure to the steel stock while they are maintained at a working temperature to rapidly conduct heat, thereby quenching the steel stock under forming pressure. The Komatsu et al process does not completely eliminate distortion in the final product and the resulting frusto-conical disc spring is described as being useful as an automotive clutch. This magnitude of tolerance control is unacceptable for use as a control mechanism, such as a gas pressure regulator where extremely close machining tolerances are required.

U.S. Pat. No. 4,039,354 to Schober describes a Belleville spring formed from a steel blank having a deliberately produced carbon gradient through the blank thickness. The level of carbon determines the transformation temperature at which austenite transforms into martensite, the desired final product. Providing a carbon level at the surface of the steel blank that is higher than the internal carbon level is designed to balance the temperature gradient set up through the blank thickness during quenching wherein the transformation temperature at the surface is lower than the transformation temperature range at the core. This enables the spring core to martensite prior to the spring surface which reduces the formation of internal tensile stresses that frequently lead to cracks and similarly undesirable imperfections in the surface finish. Tailoring the carbon gradient through the thickness of the steel blank to the correct formulation is difficult to regulate.

U.S. Pat. No. 4,135,283 to Kohlhage describes a method of hardening and roughening the surface of a Belleville spring by causing a stream of shot-peen to impinge on the spring surface. The surface is then at least partially smoothed by grinding and polishing in a drum, or by an electro-chemical process. This process does not provide a Belleville spring having a surface finish that is acceptable for use as a control mechanism for use as a gas pressure regulator, and the like.

OBJECTS

It is therefore an object of the present invention to provide an improved frusto-conical disc spring having a uniform cross sectional thickness and a smooth surface finish.

It is another object of the present invention to provide a method for manufacturing a frusto-conical disc spring by an electro-discharge machining process wherein the spring has a uniform cross-sectional thickness and a smooth surface finish.

Still another object of the present invention is to provide a method for manufacturing a frusto-conical disc spring that is acceptable for use as a control for a gas pressure regulator.

Finally, another object of the present invention is to provide a method that can be rapidly carried out to produce a frusto-conical disc spring having a high degree of dimension tolerance such that the unit cost of the spring is relatively low.

These and other objects will become increasingly apparent to those of ordinary skill in the art by reference to the following description and to the drawings.

IN THE DRAWINGS

FIG. 1 is an elevational view, partly in cross-section, showing the machining of the inner and outer annular circumferences 18 and 24 of a steel blank 10 to be formed into a frusto-conical disc spring according to the method of present invention.

FIG. 2 is an elevational view, partly in cross-section, showing the steel blank 10 of FIG. 1 mounted in a press fixture 30 and being subjected to a press-forming process to provide the general shape of a frusto-conical disc spring 48.

FIG. 3 is an elevational view, partly in cross-section, showing the spring 48 of FIG. 2 mounted in a heat treatment fixture 50 and being subjected to a heat treatment process to temper the spring 48.

FIG. 4 is an elevational view, partly in cross-section, showing the spring 48 of FIG. 3 being subjected to an electro-discharge machining process of the present invention to provide a smooth finish to the concave side 62 thereof.

FIG. 5 is an elevational view, partly in cross-section, showing the spring 48 of FIG. 3 being subjected to the electro-discharge machining process to provide a smooth finish to the convex side 56 thereof.

DETAILED DESCRIPTION

Figure 6:
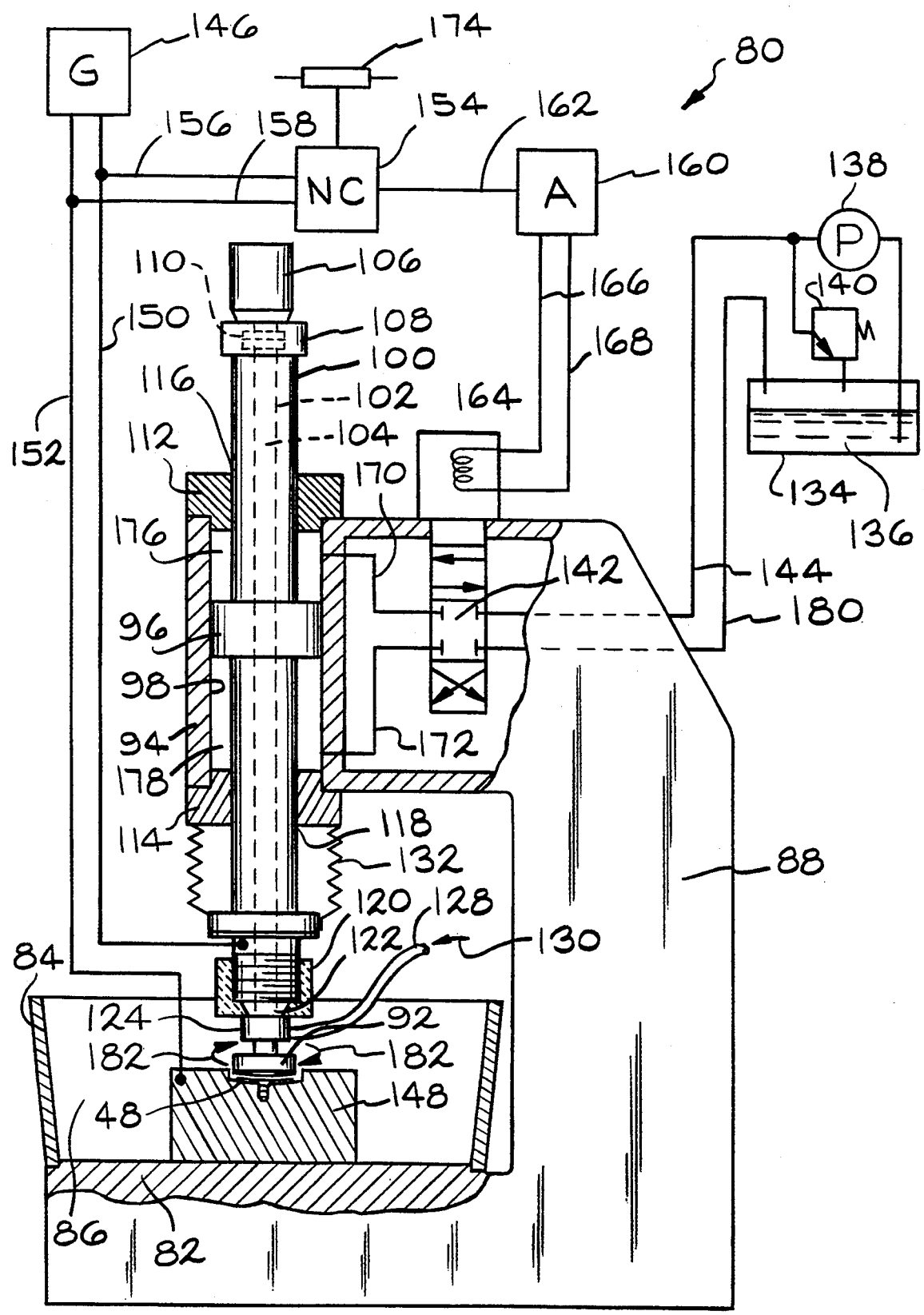
FIG. 6 is a schematic partly in section and partly in block diagram for the general arrangement of an electro discharge machining apparatus 80 for carrying out the present invention.

Referring now to the drawings, FIGS. 1 to 6 show the process for manufacturing a steel blank 10 into a frusto-conical disc. The frusto-conical disc preferably comprises a spring and most preferably a Belleville spring having a frusto-conical shape provided by an inner annular circumference which is spaced axially from the plane of the outer spring periphery or outer annular circumference and approaches that plane as the spring distorts under a compression force. The amount and shape of the distortion is directly related to the machining tolerances of the Belleville spring, which are extremely critical if the spring is intended for use as a gas pressure regulator, as is well known to those of ordinary skill in the art.

As shown in FIG. 1, steel blank 10 is a generally circular member having a central opening or aperture 12. Prior to being deformed into the frusto-conical shape, a first machining tool 14 shown schematically in FIG. 1, and having a cutting member 16 positioned normal to the plane of blank 10, is used to provide a machined finish to the peripheral edge 18 formed by the outer annular circumference by rotating the blank 10 against the cutting member 16. A second machine tool 20, also shown schematically in FIG. 1, is provided having a cutting member 22 with blank 10 rotated against cutter 10 to thereby provide a machined finish to the inner annular circumference 24 of opening 12.

As shown in FIG. 2, the steel blank 10 having the machine finished inner and outer annular circumferences 18 and 24, respectively, is then formed into the frusto-conical shape by a press-forming process, as is well known to those of ordinary skill in the art. The press forming process comprises a hydraulic press (not shown) having a press fixture 30 that includes an upper die member 32 providing an upper working surface 34 having a generally concave shape for registry with the corresponding first side 36 of the steel blank 10 and a lower die member 38 having a lower working surface 40 provided with a generally convex shape for registry with the corresponding second side 42. The steel blank 10 is initially positioned on the lower die member 38 with aperture 12 being in registry with a guide pin 44 and with the second side 42 of blank 10 facing the lower working surface 40 of die member 38. The upper die member 32 is positioned on the guide pin 44 so that the upper working surface 34 faces the first side 36 of blank 10. The assembled press fixture 30 is then mounted in the hydraulic press (not shown) that provides for moving the die members 32 and 38 towards each other with upper die member 32 traveling along pin 44 and towards blank 10 supported on lower die number 38, as indicated by arrow 46 in FIG. 2. Thus, the hydraulic press applies mechanical pressure to deform the steel blank 10 into a frusto-conical shape forming the frusto-conical disc spring 48 when the blank 10 is squeezed between the upper and lower die members 32 and 38 moved towards relative engagement with respect to each other, as is well known to those of ordinary skill in the art.

The hydraulic press is then reciprocated to a release position so that the press fixture 30 can be removed from the press. The die members 32 and 38 are separated and the spring 48 is removed from the press fixture 30 and positioned in a heat treatment fixture 50, as shown in FIG. 3, for the purpose of heat treating the spring 48. Heat treatment fixture 50 an upper member 52 having a generally concave working surface 54 for registry with the corresponding convex first side 56 of spring 48 and a lower member 58 having a generally convex working surface 60 for registry with the concave second side 62 of spring 48. The upper and lower members 52 and 58 are provided with respective axial guide channels 64 and 66 that receive a bolt 68 having a threaded end for engagement with nut 70. Upper member 52 further has an enlarged recess 72 that receives the head 74 of the bolt 68. This provides for securing the members 52 and 58 in registry with the respective sides 56 and 62 of the intermediate spring 48 tensioned between the die members 52 and 58 when the bolt 68 is positioned through the axial guide channels 64 and 66 and through the aperture 12 in spring 48 with nut 70 threadingly engaged with bolt 68.

The assembled heat treatment fixture 50 is then placed in a suitable autoclave (not shown) and heated to a temperature of about 900° F. for about one hour. The heated fixture 50 and spring 48 are then removed from the autoclave and allowed to air cool to complete the heat treatment process. The purpose of the heat treatment fixture 50 is to eliminate as much as possible any distortion in the material comprising the spring 48 to thereby obtain the desired hardness and generally to set the spring 48 to its final shape.

The preferred material for spring 48 is commercially available 17-7 ph, condition C stainless steel. After being subjected to the heat treatment process, the stainless steel material has a condition CH 900, as is well known to those of ordinary shell in the art.

As previously discussed, springs that are intended for use as gas pressure regulators and the like require exact tolerances that are unattainable through conventional stamping and forming processes. Thus, the method of the present invention comprises a finishing process wherein the formed and hardened frusto-conical disc spring 48 is further machined by electro-erosion. FIG. 6 shows a typical electrical discharge machining apparatus 80, hereinafter referred to as an EDM apparatus, with portions of the machine 80 broken away to show the internal construction comprising a base 82 supporting a tank or enclosure 84, partly filled with a dielectric fluid 86 of the type particularly useful for electro-erosion machining, such as, for example, kerosene, paraffin, light oil and the like. Base 82 supports a vertically extending post or column 88 having a cantilever portion 90 projecting over tank 84. Cantilever 90 is adapted to support a feed and guide mechanism for an electrode tool 92. The feed and guide mechanism comprises a stationary cylinder 94 affixed to the end of cantilever 90 and a reciprocable piston member 96 disposed for reciprocating movement along an internal bore 98 formed within cylinder 94. Piston 96 is coaxially formed integrally with or, alternatively, is affixed to a cylindrical member 100 at a position intermediate the ends of cylinder 100. Cylinder 100 is provided with an interior bore 102 (shown in dashed lines in FIG. 6) that supports a rotatable shaft 104 with a rotary motor 106 mounted on a plate 108 provided at a distal, upper end of cylinder 100 and connected to shaft 104 for rotation thereof by coupling 110.

The opposite ends of bore 98 in cylinder 94 are closed by end plates, identified respectively at 112 and 114. Each end plate is provided with a cylindrically shaped plate bore, shown at 116 and 118, respectively, forming hydrostatic bearings that serve to support and linearly guide the cylindrical member 100 proximate the end portions thereof projecting from the cylinder bore 98 and through the end closure plates 112 and 114. The lower end of cylindrical member 100 threadingly mates with an insulator 120 having a recess that carries an extension member 122 provided with a rotating union 124 mounted coaxially around shaft 104 (FIGS. 4 and 5) and in a rotatable and fluid flow communication with an internal shaft bore 126 (FIGS. 4 and 5), as is well known to those of ordinary skill in the art. Union 124 supplies dielectric fluid from an external pump (not shown) through conduit 128 to the rotating union 124, as indicated by arrow 130, and then to the electrode tool holder 92, and the interchangeable electrode tool means, shown as electrode 194 and 200 in FIGS. 4 and 5, respectively, for flushing against the spring 48. The electrode tool means is adapted to machine, by an electro-erosion process, an appropriate surface of the diaphragm spring 48 to be electrically discharge machined into a finished diaphragm spring, preferably of the Belleville type, that is suitable for use as a gas pressure regulator and the like. A bellows sleeve member 132 is preferably disposed around the end portion of cylindrical number 100 to provide protection for the surface of the member 100 from splattering dielectric fluid and from fumes that my cause a superficial attack of the rod surface.

The advance and retraction of electrode tool holder 92 supporting the interchangeable electrode tool means along the work centerline defined by the longitudinal axis of cylinder 100 is controlled by a hydraulic servo-mechanism comprising a reservoir 134 filled with an appropriate hydraulic fluid 136 circulated by a pressurizing and circulating pump 138 provided with a pressure regulator 140. Pressurized hydraulic fluid 136 is supplied by pump 138 to an electrical solenoid actuated four-way valve 142, via conduit 144, for the purpose to be hereinafter described. The machining electrical discharges between the electrode tool means and the spring 48 are supplied by a pulse generator 146 that is connected to the cylinder 100 supporting shaft 104 and electrode tool holder 92 and a support pedestal means 148 provided in tank 84 to support the spring 48, by respective power lines 150 and 152. A control mechanism, such as a computer numerical controller 154, is electrically connected across this machining gap between pedestal means 148 and electrode tool holder 92 by transmission cables 156 and 158, respectively, and is adapted to supply an electrical signal to amplifier 160 via cable 162. The output of amplifier 160 is electrically connected to the solenoid coil 164 of valve 142 via power lines 166 and 168, and is arranged to controllably cause valve 142 to direct pressurized hydraulic fluid to either end of cylinder bore 98 via upper and lower hydraulic lines 170 and 172 so as to cause displacement of piston 96, and consequently cylinder 100, shaft 104 and electrode tool holder 92 mounted on the end thereof, in an appropriate direction along the work centerline.

Numerical controller 154 is adapted to sense the voltage across the machinery gap provided between the pedestal means 148 and electrode tool holder 92 via transmission cables 156 and 158 as previously discussed, and to compare this gap voltage to an adjustable reference voltage 174. A higher than normal voltage across the machining gap indicates to the numerical controller 154 that the machining gap is too wide and presents a resistance preventing the machining current from reaching the predetermined valve for which current generator 146 and the voltage reference 174 have been set. Numerical controller 154 through amplifier 160 then controls valve 142 to introduce hydraulic fluid 136 into the upper portion of cylinder bore 98, or chamber 176, while hydraulic fluid 136 is exhausted from the lower portion of cylinder bore 98 or chamber 178 through hydraulic line 172 and through valve 142 in fluid communication with return line 180 returning hydraulic fluid to reservoir 134. Therefore, piston 96 is urged downwardly, as seen in FIG. 6, thereby downwardly displacing cylinder 100, and consequently advancing the active or working face of the electrode tool means associated with electrode tool holder 92 along the work centerline towards the diaphragm spring 48, thereby reducing the width of the machining gap.

This decrease of the machining gap width causes an increase in the current and consequently a decrease of the voltage across the gap towards the predetermined valve corresponding to the current setting of the pulse generator 146 and the voltage of voltage reference 174. In the event that the machining gap is decreased to the extent that there is caused an increase in the current flowing across the gap with an accompanied drop in the voltage across the gap, which is, to a greater extent, the case in the event of a short circuit between the electrode tool means and the spring 48, the decreased gap voltage below the predetermined voltage reference level is sensed by numerical controller 154 which, through amplifier 160, controls four-way valve 142 to introduce hydraulic fluid into the lower chamber 178 in cylinder 94, resulting in an upward motion of piston 96, cylinder number 100 and electrode tool holder 92 to thereby reestablish the predetermined voltage level across the machining gap. The advance and retraction of the electrode tool holder 92 towards and away from the spring 48 along the work centerline, as controlled by valve 142 is thereby monitored by the numerical controller 154 to maintain a predetermined constant voltage across the gap which is continuously compared to the voltage of voltage reference 174. As the width of the machining gap is regulated to maintain the predetermined constant gap voltage, the motor 106 mounted on plate 108 provides for rotating the shaft 104 inside the cylinder 100. This rotational movement is indicated by arrows 182 in FIG. 6, and will hereinafter be explained in detail.

In a typical electro-erosion process using EDM apparatus 80 just described, the electrode tool means and the frusto-conical disc spring 48 are separated by a small gap, typically 100 $\mu m$, filled with the dielectric fluid 86. An applied voltage, usually about 80 V, is applied across the machining gap. Current flow is preferably in excess of 5 amperes and results in the formation of a dielectric vapor bubble due to Joule heating that plays a significant part in the sparking action in the EDM process. After an "ignition delay," typically of about 0.1 to 5 μs, material breakdown of the spring 48 surface occurs. Sparking then takes place across the inter-electrode machining gap. In order to prevent arcing, the voltage is removed after a short interval. A further short interval is then allowed to elapse before the next voltage pulse so that the dielectric fluid in the inter-electrode machining gap can deionize. The consequence of a series of voltage pulses applied across the gap is the production of a set of random discrete discharges. The discharges affect both the electrode 110 and spring 48, causing the local temperature to rise to about 4,000° to 10,000° K. This intense heat at the electrodes results in metal removal by vaporization.

FIGS. 4 and 5 show in detail the process of finish electro-erosion of material from the respective concave and convex sides 62 and 56 of the spring 48 by means of the EDM apparatus 80 previously described in detail. The spring 48 is initially mounted on a first pedestal 184 that is supported in tank 84 immersed in the dielectric fluid 86, pedestal 184 having a recessed concave support surface 186 for registry with the convex side 56 of the spring 48.

A threaded opening 188 is provided along the axis of pedestal 184 and mates with a dampening means, such as screw 190 having an enlarged head contacting the inner annular circumference of aperture 12 to hold spring 48 on pedestal 184 in the desired position and to quell resonance vibrations that may be set up in spring 48 as material is removed by means of electro-erosion between the convex shaped working surface 192 of electrode tool 194 attached to tool holder 92 threaded onto shaft 98 and the concave side 62 of spring 48. As shown in FIG. 4, tool holder 92 is provided with a manifold 196 that is in communication with a plurality of parallel through channels 198 for directing dielectric fluid 86 against the concave side 62 during the short interval when sparking is not occurring between tool 194 and spring 48. This serves to flush any material that has been removed during the previous electro-erosion event. Manifold 82 is supplied with dielectric fluid 86 from tank 84 by means of a suitable pump (not shown) that feeds through conduit 128, as shown by arrow 130 in FIG. 6, to the rotating union 124, in communication with manifold 196. The dielectric fluid 86 washes against the concave side 62 of spring 48 to cleanse any removed material and to provide a clean surface with which to reestablish another electro-erosion event between electrode tool 194 and spring 48, as previously discussed in detail, to further remove material from the concave side 62 of spring 48. This process is repeated until side 62 is similar in shape to that of the working surface 192 of tool 194. The rotational movement of tool 194 prevents the formation of built-up material on spring 48 at positions corresponding to the fluid channels 198. Machining tolerances that are obtainable with this type of process enable material removal to be held to a tolerance of ±0.0002 inches.

Upon completion of the electro-erosion of the concave side 62 of spring 48, electrode tool 194 is retracted from its gapped relationship with spring 48 by appropriate numerical control of solenoid 164 which actuates valve 142 to introduce hydraulic fluid 136 into cylinder chamber 178, as previously described in detail, thereby reciprocating piston 96 and cylinder 100 and shaft 104 along cylinder bore 98 so that tool 198 can be removed from holder 92 and replaced with a second electrode tool 200 having a concave working surface 202 adapted to machine material from the convex side 56 of spring 48. Pedestal 184 is then removed from tank 84 and replaced with a second pedestal 204 having a recessed support surface 206 for registry with the concave side 62 of spring 48 held in position on pedestal 204 by screw 190 threaded into opening 188. As previously described with respect to electrode tool 194, electric tool 200 is provided with a plurality of parallel through channels 208 that are supplied with dielectric fluid 86 from manifold 196 in tool holder 92 to direct the dielectric fluid against the convex surface 56 of spring 48 during the short interval when sparking is not occurring between tool 200 and spring 48, to thereby flush removed material from side 56. The electro-erosion process previously described in detail is thus carried out to remove material from the convex side 56 of spring 48 until this side has a shape similar to that of the working surface 206 of electrode tool 200 with machining tolerance of ±0.0002 inches obtainable.

Due to this high degree of surface finish tolerance, the spring produced by the process of the present invention is particularly suitable for use as a gas pressure regulator and the like. This requires a high degree of machining tolerance that heretofore was not possible with previous methods for making frusto-conical disc springs, and more particularly, Belleville springs.

It is appreciated that various modifications to the inventive concepts may be apparent to those of ordinary skill in the art without departing from the spirit and scope of the invention and the invention is therefore to be limited only by the hereinafter appended claims.

We claim:

1. An electrical discharge machining process for manufacturing a spring means, which comprises:
   a) providing an electrical discharge machining apparatus comprising: a frame means having a support pedestal means for supporting an electrode workpiece that is intended to be machined into the spring means, wherein the electrode workpiece has a first and second sides immersed in a pool of dielectric fluid; a reciprocating means attached to the frame means and movable along a work centerline towards and away from the support pedestal means and the electrode workpiece supported thereon; and first and second electrode tool means interchangeably attachable to the reciprocating means, the electrode tool means having respective first and second work surfaces providing the shape of the spring means;
   b) supporting the electrode workpiece on the support pedestal means with the first side of the workpiece aligned along the work centerline, facing the first work surface of the first electrode tool means attached to the reciprocating means;
   c) moving the reciprocating means along the work centerline, towards the electrode workpiece to provide a first clearance filled with the dielectric fluid between the first work surface and the first side of the electrode workpiece;
   d) applying an intermittent unidirectional voltage between the first electrode tool means and the electrode workpiece via the dielectric fluid to effect electrical discharge removal of material from the first side of the electrode workpiece and provide said first side having a shape similar to that of the first work surface;

e) moving the reciprocating means to a position spaced from the electrode workpiece, wherein the first electrode tool means is replaced with the second electrode tool means attached to the reciprocating means and the electrode workpiece is repositioned supported on the support pedestal means such that the second side of the electrode workpiece is aligned along the work centerline, facing the second work surface of the second electrode tool means attached to the reciprocating means;

f) moving the reciprocating means along the work centerline, towards the electrode workpiece to provide a second clearance filled with the dielectric fluid between the second work surface and the second side of the electrode workpiece; and g) applying an intermittent unidirectional voltage between the second electrode tool means and the electrode workpiece via the dielectric fluid to effect electrical discharge removal of material from the second side of the electrode workpiece and provide said second side having a shape similar to that of the second work surface, thereby providing the spring means.

2. The process of claim 1 wherein the spring means is a Belleville spring.

3. The process of claim 1 wherein a rotating means attached to the frame means further provides for rotating the reciprocating means to thereby rotate the first and second electrode tool means during application of the intermittent unidirectional voltage between the respective electrode tool means and the electrode workpiece providing electrical discharge removal of material from the respective first and second sides of the electrode workpiece.

4. The process of claim 1 wherein the electrical discharge machining apparatus further comprises a pump means for the dielectric fluid and the first and second electrode tool means are provided with flushing channels in fluid flow communication with a plurality of openings provided in the respective work surfaces, the pump means moving dielectric fluid out through the openings to flush the electrode workpiece as material is removed from the respective sides of the electrode workpiece.

5. The process of claim 1 wherein a rotating means attached to the frame means provides for rotating the reciprocating means to thereby rotate the first and second electrode tool means about the work centerline, and wherein the electrical discharge machining apparatus further comprises a pump means for the dielectric fluid and the first and second electrode tool means are provided with flushing channels in fluid flow communication with a plurality of openings provided in the respective work surfaces such that during the electrical discharge machining process, the pump means moves dielectric fluid out through the openings to flush the electrode workpiece while the rotating means rotates the first and second electrode tool means about the work centerline as the intermittent unidirectional voltage is applied between the electrode tool means and the electrode workpiece to remove material from the respective sides of the electrode workpiece.

6. The process of claim 1 wherein the support pedestal means comprises cooperating first and second pedestal members having the shape of the respective first and second sides of the electrode workpiece and wherein the second side of the electrode workpiece is supported on the second pedestal member as the first side of the electrode workpiece is machined by the first electrode tool means and wherein the first side of the electrode workpiece is supported on the first pedestal member as the second side of the electrode workpiece is machined by the second electrode tool means to provide the spring means.

7. The process of claim 1 wherein the spring means has a frusto-conical shape provided by the first side of the electrode workpiece having a concave shape and the second side having a convex shape.

8. The process of claim 1 wherein the first electrode tool work surface has a concave shape for removing material from the first side of the electrode workpiece to thereby provide said first side with a convex shape and wherein the second electrode tool work surface has a convex shape for removing material from the second side of the electrode workpiece to thereby provide said second side with a concave shape, thereby providing the spring means having a frusto-conical shape.

9. The process of claim 1 wherein the electrode workpiece initially comprises a workpiece blank having a centrally located opening, the workpiece blank being subjected to a stamping process to provide a frusto-conical shape before the electrode workpiece is subjected to the electrical discharge machining process.

10. The process of claim 9 wherein the workpiece blank comprises a pre-hardened stainless steel plate that is subjected to the stamping process.

11. The process of claim 10 wherein the electrode workpiece is provided with a frusto-conical shape having machined inner and outer annular circumferences.

12. The process of claim 11 wherein the electrode workpiece is provided with the machined inner and outer annular circumferences before the electrode workpiece is subjected to the electrical discharge machining process.

13. The process of claim 10 wherein the workpiece blank is subjected to a heat treating step to thereby provide the prehardened stainless steel plate.

14. The process of claim 13 wherein the heat treated step comprises tensioning the workpiece blank between two die members having surfaces in registry with the first and second sides thereof and heating the workpiece blank to about 900° F. for about one hour.

15. The process of claim 14 wherein the workpiece blank is air cooled to ambient temperature before being subjected to the electrical discharge machining process.

16. The process of claim 1 wherein the removal of material from the respective first and second sides of the electrode workpiece is held to a tolerance of about ±0.0002 inches.

17. The process of claim 1 wherein a dampening rod means contacts the electrode workpiece supported on the support pedestal means thereby preventing vibration of the electrode workpiece during the electrical discharge removal of material from the respective sides of the electrode workpiece.

18. The process of claim 17 wherein the electrode workpiece is provided with a centrally located opening and the dampening rod means comprises a threaded member having an enlarged head portion and wherein the electrode workpiece is supported on the support pedestal means with the threaded member received in a pedestal opening and the enlarged head portion contacting the inner annular circumference of the centrally located opening to thereby prevent vibration of the electrode workpiece.

19. The process of claim 18 wherein the threaded member is a flat head screw.

\* \* \* \* \*